March 10, 1936.  N. B. GREEN  2,033,703

FOLDING CAMERA

Filed Nov. 1, 1934  2 Sheets-Sheet 1

Inventor:
Newton B. Green, by Newton M. Perrins,
Donald H. Stewart.
Attorneys

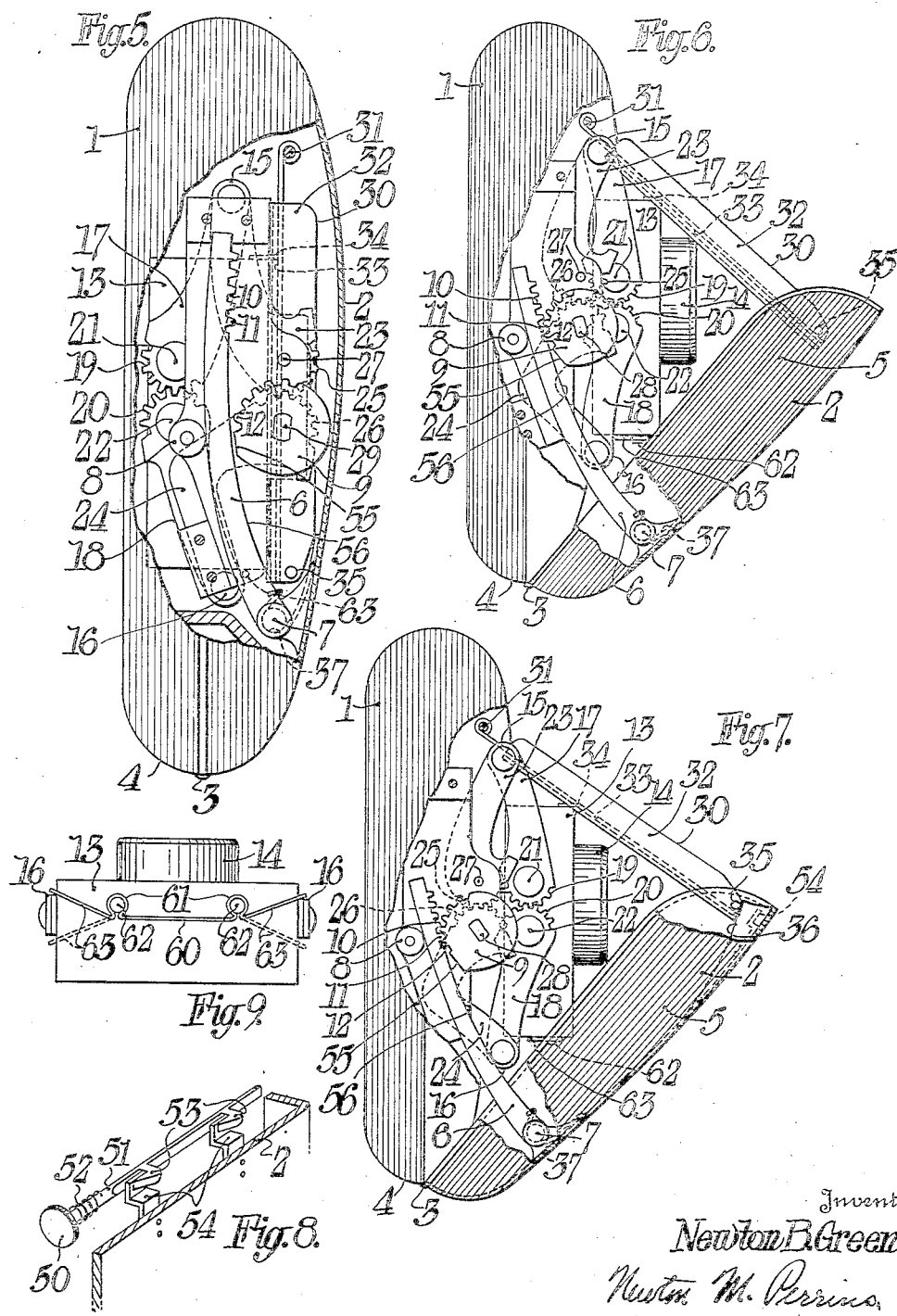

Patented Mar. 10, 1936

2,033,703

UNITED STATES PATENT OFFICE 2,033,703

FOLDING CAMERA

Newton B. Green, Rochester, N. Y., assignor to Eastman Kodak Company, Rochester, N. Y., a corporation of New York Application November 1, 1934, Serial No. 751,023

14 Claims. (Cl. 95—32)

This invention relates to photography, and more particularly to photographic cameras.

One object of my invention is to provide a camera which will fold compactly into a small space. Another object of my invention is to provide a camera of the class described in which a number of folding parts will fold together in the proper timed relation by means of moving a single part. Another object of my invention is to provide a camera with a bed arranged at an angle so as to form a convenient grip by which the camera may be handled. Still another object of my invention is to provide a camera in which the lens board is moved in a direction parallel to the camera and in which the lens board can be moved by the camera bed through the braces which are adapted to hold the bed in an open or operative position. Still another object of my invention to to provide a camera of the type described in which the lens board is covered first by a cover plate and then by the camera bed and to interconnect all of these parts so that they will move in the proper relation to each other in opening and closing the camera, and other objects will appear from the following specification, the novel features being particularly pointed out in the claims at the end thereof.

Coming now to the drawings, wherein like reference characters denote like parts throughout—

Fig. 5 is an enlarged side elevation with parts broken away showing the folding mechanism in an inoperative or folded position.

Fig. 6 is a side elevation on a somewhat smaller scale than Fig. 5, but with the parts arranged in a partially open position.

Fig. 7 is a view similar to Fig. 6, but with the parts shown in a slightly different position.

Fig. 8 is a fragmentary perspective view showing the latch for retaining the camera parts in a closed position.

Fig. 9 is a bottom plan view of the lens board 13 showing the opening spring.

Figure 1:
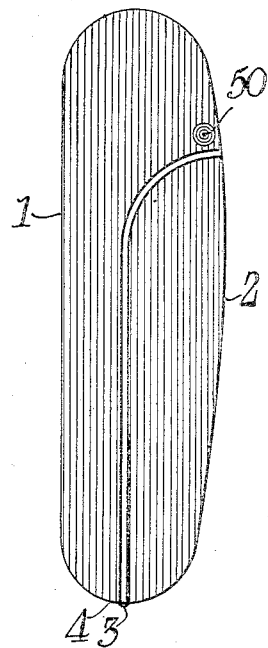
Fig. 1 is a side elevation of a camera constructed in accordance with and embodying a preferred form of my invention.
Figure 2:
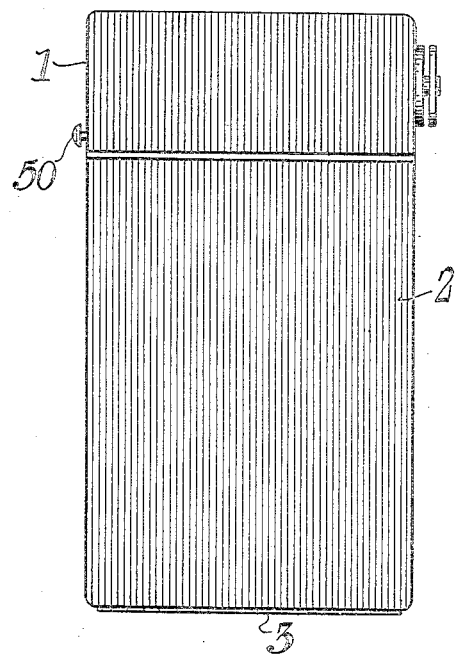
Fig. 2 is a front plan view of the camera shown in Fig. 1.

As illustrated in the preferred embodiment of my invention shown in the drawings, the camera may consist of a body portion 1 to which a bed 2 is hinged at 3. This bed may be swung from the position shown in Fig. 1 to that shown in Fig. 3 in which the camera is open in position for use.

The camera bed 2 differs from the usual camera bed in that it is hinged to an end wall 4 of the camera body and in that it is provided with side walls 5 which partially telescope the sides of the camera body. This bed may be supported in its open position, as shown in Fig. 3, by means of a pair of bed braces 6 which are pivotally attached at 7 to the camera bed and which have a sliding engagement with the camera body, this engagement being due to a roller 8 and a mutilated gear 9.

On the ends of the bed braces 6 there are racks 10 adapted to mesh with the mutilated gears 9, the racks 10 terminating in enlarged teeth 11 which are adapted to engage complementary shaped teeth 12 in the gear segment. The roller 8 always holds the brace 6 against the mutilated gear.

Figure 3:
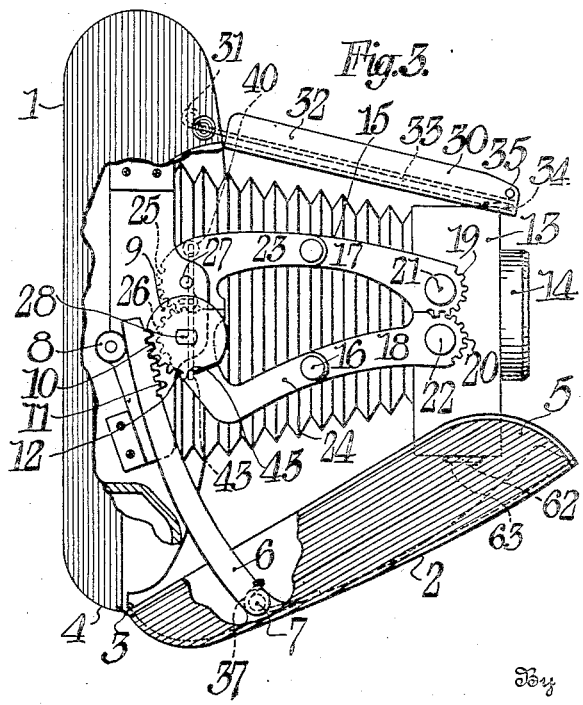
Fig. 3 is a side elevation of the camera shown in Fig. 1, but with the parts arranged in an open position.

When the camera is to be used, the bed 2, by means of the side plates 5, can be drawn away from the camera body so as to turn the bed upon the hinge 3, thus drawing down on the brace 6 so that the roller 8, by causing the teeth 10 to mesh with the mutilated gear 9, will cause the lens board 13 to be moved into the picture-taking position shown in Fig. 3.

The lens board 13 may be of any usual type and may support an objective in a barrel 14. The lens board is supported by means of a pair of intergeared, jointed supporting arms designated broadly as 15 and 16. The front sections 17 and 18 of these arms are geared together by means of the gear segments 19 and 20 which turn upon studs 21 and 22 carried by the lens board 13. The rear sections of these arms 23 and 24 are intergeared by the gear segments 25 and 26 which are supported by the shafts 27 and 28 carried by the camera body 1. Shaft 28 not only supports the gear segment 26, but it likewise supports the mutilated gear 9. Since neither of these gears can turn on the shaft 28, when the mutilated gear 9 turns, the shaft 28 will turn, causing the gears 25 and 26 to turn and the jointed supporting arms 15 and 16 to project the lens board 13 away from the camera body although it is retained at all tines parallel to the camera body.

I prefer to provide a cover plate 30 which may fold down over the lens board 13, this cover plate being hinged to the camera body by a pintle 31. Each of the sides 32 of this cover plate are grooved at 33 to receive pins 34 so that the movement of the lens board 13 will control the movement of the cover plate 30. As the lens board 13 moves towards the camera body, the cover plate 30 will turn upon its hinge pintle 31 and fold down over the front plate. This movement is assisted by pins 35, carried on the ends of the cover plate 30, as soon as the parts reach the position shown in Fig. 7, because these pins then come in contact with cams 36 carried by the camera bed 2. The shape of these cams is such that as the pins 35 slide down the cams, they will fold over the lens board 13 in advance of the folding movement of the camera bed 2.

It will be noted from the various figures, and particularly from Fig. 5, that the bed braces 6 have a tendency to move downwardly when the parts are in folded position, this being due to the spring 37 which encircles the pivot 7 by which the arms 6 are attached to the camera bed.

I contemplate either making these springs of sufficient strength to cause the entire camera to move from the closed position shown in Fig. 5 to the open position shown in Fig. 3 without an operator applying any force to the camera bed 2, or I may make the springs 37 only of sufficient strength to assist in such movement. In the latter case, an operator can positively draw the bed 2 downwardly about its hinge and thus cause the camera parts to move into the operative or picture-taking position shown in Fig. 3.

Figure 4:
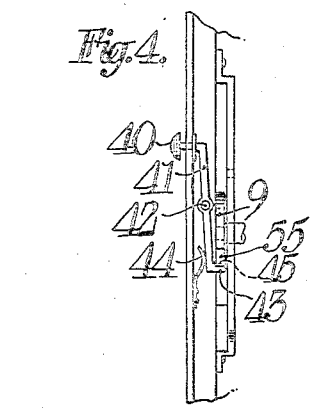
Fig. 4 is a fragmentary detail showing the camera latch.

In order to hold the camera in an open position, any type of latch may be used, but I have here shown a latch, as indicated in Fig. 4, as consisting of a push-button 40 carried on one end 41 of a lever pivoted at 42 and having a latching end 43 pressed by a spring 44 into engagement with the last tooth 45 on the mutilated gear 9. This is best shown in Figs. 3 and 4.

When an operator desires to close the camera, it is only necessary to press inwardly upon the push-button 40 to release this gear so that the camera can be folded up.

As shown in Fig. 9, there is a spring member 60 looped at 61 to partially encircle pin 62 and having the ends thereof 63 projecting outwardly into the path of the supporting arm 16. Thus, when the camera is closed, as shown in Fig. 5, the spring ends 63 are under tension, and by thrusting on the arm 16 will cause the camera to start opening, this opening movement being also assisted by the springs 37.

A separate latch shown in Fig. 8, which may also be of any well known type, is used to hold the camera in a closed position. This latch may consist of a push-button 50 carried by a bar 51 normally moved by a spring 52 so that the hooks 53 on this bar will engage lugs 54 carried by the camera bed 2. By pressing the camera bed up against the body, these latching elements become engaged. To open the camera, the push-button 50 may be pressed, releasing the latching engagement of parts 53 and 54.

The operation of this camera is quite simple. With the parts in the position shown in Fig. 1, the push-button 50 may be depressed, releasing the latching engagement of parts 53 and 54 so that the bed 2 may swing upon its hinge pintle 3 to the position shown in Fig. 3. The first part of the opening movement of the bed permits the braces 6 to slide downwardly while the mutilated gear 9 remains stationary as long as the flats 55 on the mutilated gears 9 rests on the curved surfaces 56 of the bed braces 6. As soon, however, as the camera bed has been lowered sufficiently to cause the rack teeth 10 to engage the complementary teeth of the mutilated gear, this gear is turned and with it the jointed, intergeared lens board supporting arms start their movement to project the lens board 13 into the picture-taking position shown in Fig. 3. The movement of the lens board 13 is parallel to the camera body. As the lens board moves out, the cover plate 30 also swings upwardly until it also reaches the position shown in Fig. 3, in which the camera is in a picture-taking position. As the camera reaches this position, the latch elements 43 and 45 become engaged to prevent accidental movement of these parts.

As soon as it is desired to close the camera, the latch push-button 40 can be depressed so as to release the latch elements 43 and 45, permitting the camera to be closed by swinging the bed 2 about its hinge 3. During this movement, the parts return through the positions shown in Figs. 6 and 7 to the position shown in Fig. 5.

It should be noted that with a camera constructed in accordance with my invention, the camera bed, when fully open, is at a convenient angle to permit an operator to support the camera for taking pictures. The bed 2 having the side wings 5 is of substantial size and forms a convenient grip.

Having thus described my invention, what I claim as new and desire to secure by Letters Patent of the United States is:

1. In a folding camera, the combination with a camera body, of a bed hingedly attached thereto, a brace movably attached to the bed and slidably mounted on the camera body, a lens board, means for movably supporting the lens board from the camera body including pairs of intergeared, jointed supporting arms, operable connections between at least one of said supporting arms and said bed brace whereby the former may be operated by the latter.

2. In a folding camera, the combination with a camera body, of a bed hingedly attached thereto, a brace movably attached to the bed and slidably mounted on the camera body, a lens board, means for movably supporting the lens board from the camera body including pairs of intergeared, jointed supporting arms, operable slip connections between said bed brace and at least one of said supporting arms through which movement of the bed may transmit motion to the jointed supporting arms through only a portion of the movement of the bed brace.

3. In a folding camera, the combination with a camera body, of a bed hinged thereto, braces pivotally attached to the bed and slidably mounted on the camera body, a lens board, jointed supporting arms pivoted to the lens board and to the body, and means for operating said jointed supporting arms from the bed through the bed braces.

4. In a folding camera, the combination with a camera body, of a bed hinged thereto, braces pivotally attached to the bed and slidably mounted on the camera body, a lens board, jointed supporting arms pivoted to the lens board and to the body, and means for operating said jointed supporting arms from the bed through the bed braces, said means including racks carried by said braces and gears carried by said jointed supporting arms.

5. In a folding camera, the combination with a camera body, of a bed hinged thereto, braces pivotally attached to the bed and slidably mounted on the camera body, a lens board, jointed supporting arms pivoted to the lens board and to the body, means for operating said jointed supporting arms from the bed through the bed braces, said means including racks carried by said brace and gears carried by said jointed supporting arms, and means included in the racks and gears whereby said racks may move said gears throughout only a part of their movement.

6. In a folding camera, the combination with a camera body, of a bed hinged thereto, braces pivotally attached to the bed and slidably mounted on the camera body, a lens board, jointed supporting arms pivoted to the lens board and to the body, and means for operating said jointed supporting arms from the bed through the bed braces, said means including racks carried by said braces and gears carried by said jointed supporting arms, said means permitting said racks to slide idly by said gears after a predetermined amount of rotation of said gears.

7. In a folding camera, the combination with a camera body, of a bed hingedly attached thereto, a bed brace pivotally attached to the bed and slidably mounted on the body, a rack carried by the brace, a lens board, supports for the lens board including jointed, intergeared arms, a gear segment on one intergeared arm with a flat adjacent the gear segment, whereby said rack may engage and move the gear until the flat contacts with the bed brace beyond the end of the rack so that continued movement of the bed brace will permit the gear segment to remain stationary.

8. In a folding camera, the combination with a camera body, of a bed hingedly attached thereto, a lens board, jointed, intergeared supports for the lens board on which the latter may move to and from the camera body in parallel relation thereto, a brace connected to the camera bed and slidably mounted on the camera, connections between at least one of said jointed, intergeared arms and said brace through which said bed may be moved about its pivot a material distance before said connections transmit movement to said jointed, intergeared arms.

9. In a folding camera, the combination with a camera body, of a bed hingedly attached thereto, a lens board, jointed, intergeared supports for the lens board on which the latter may move to and from the camera body in parallel relation thereto, a brace connected to the camera bed and slidably mounted on the camera, connections between at least one of said jointed, intergeared arms and said bed brace through which said bed may be moved about its pivot a material distance before said connections transmit movement to said jointed, intergeared arms, a cover plate pivotally attached to the camera body, and connections between the cover plate and lens board for swinging the cover plate about its hinge when the lens board is moved upon said jointed, intergeared arms.

10. In a folding camera, the combination with a camera body, of a bed hingedly attached thereto, a lens board, jointed, intergeared supports for the lens board on which the latter may move to and from the camera body in parallel relation thereto, a brace connected to the camera bed and slidably mounted on the camera, a cover plate pivotally attached to the camera body, connections between the cover plate, lens board, at least one of said pivoted, intergeared arms, and said bed brace whereby the parts may all be moved in a definite relation, permitting the camera to open and close.

11. In a folding camera, the combination with a camera body having an opening in a wall thereof, a lens board mounted in the opening, supporting arms on which the lens board may move to and from the camera body in parallel relation thereto, a cover plate hinged to one side of the opening, a bed hingedly connected to the other side of the opening, a brace for the bed, connections between the brace, lens board and cover plate adapted to move the lens board into the opening, the cover plate over the lens board and the bed over the cover plate in closing the camera.

12. In a folding camera, the combination with a camera body having an opening in a wall thereof, a lens board mounted in the opening, supporting arms on which the lens board may move to and from the camera body in parallel relation thereto, a cover plate hinged to one side of the opening, a bed hingedly connected to the other side of the opening, a brace for the bed, connections between the brace, lens board and cover plate, whereby a force applied to the bed may cause the movably mounted parts to move to open or close the camera.

13. In a folding camera, the combination with a camera body, of a bed hingedly attached thereto, a brace movably attached to the bed and slidably mounted on the camera body, a lens board, means for movably supporting the lens board including pairs of intergeared, jointed supporting arms, operable connections between at least one of said supporting arms and said bed brace comprising a gear and rack, and a latch adapted to hold and release the camera bed from an open position, said latch including a movably mounted locking lug adapted to engage a tooth of said gear.

14. In a folding camera, the combination with a camera body, of a bed hingedly attached thereto, a brace movably attached to the bed and slidably mounted on the camera body, a lens board, means for movably supporting the lens board including pairs of intergeared, jointed supporting arms, operable connections between at least one of said supporting arms and said bed brace comprising a gear and rack, and a latch operable from the exterior of the camera for releasing the brace attached to the camera bed whereby the bed may fold about its hinge pintle.

NEWTON B. GREEN.